United States Patent
Jornod et al.

(10) Patent No.: US 11,513,513 B2
(45) Date of Patent: Nov. 29, 2022

(54) METHOD FOR INVOKING A TELEOPERATED DRIVING SESSION, APPARATUS FOR PERFORMING THE STEPS OF THE METHOD, VEHICLE AND COMPUTER PROGRAM

(71) Applicant: VOLKSWAGEN AKTIENGESELLSCHAFT, Wolfsburg (DE)

(72) Inventors: Guillaume Jornod, Berlin (DE); Andreas Pfadler, Berlin (DE); Israel Gonzalez Vazquez, Wolfsburg (DE)

(73) Assignee: Volkswagen Aktiengesellschaft

( * ) Notice: Subject to any disclaimer, the term of this patent is extended or adjusted under 35 U.S.C. 154(b) by 35 days.

(21) Appl. No.: 17/178,339

(22) Filed: Feb. 18, 2021

(65) Prior Publication Data
US 2021/0255617 A1 Aug. 19, 2021

(30) Foreign Application Priority Data
Feb. 19, 2020 (EP) .................................... 20158259

(51) Int. Cl.
*G05D 1/00* (2006.01)
*B60W 40/02* (2006.01)
(Continued)

(52) U.S. Cl.
CPC ......... *G05D 1/0022* (2013.01); *G05D 1/0214* (2013.01); *H04L 43/0811* (2013.01); *H04L 67/61* (2022.05)

(58) Field of Classification Search
CPC .... G05D 1/0022; G05D 1/0214; H04L 67/61; H04L 43/0811
See application file for complete search history.

(56) References Cited

U.S. PATENT DOCUMENTS

| 9,494,935 B2 | 11/2016 | Okumura et al. |
| 9,507,346 B1 | 11/2016 | Levinson et al. |
(Continued)

FOREIGN PATENT DOCUMENTS

| KR | 20170048766 A | 5/2017 |
| WO | 2019081039 A1 | 5/2019 |
(Continued)

OTHER PUBLICATIONS

Search Report for European Patent Application No. 20158259.0; dated May 15, 2020.
(Continued)

*Primary Examiner* — Christopher B Robinson
(74) *Attorney, Agent, or Firm* — Barnes & Thornburg, LLP

(57) ABSTRACT

A method for invoking a teleoperated driving session for a transportation vehicle equipped with an automated driving function, hereinafter called teleoperated driving session, wherein the transportation vehicle is equipped with a number of environment detection sensors and a communication module for communicating to a control center computer. The method includes determining a quality of service prediction for the communication between the transportation vehicle and the control center computer for the time when the teleoperated driving session is invoked, and selecting the class of data to be exchanged with the control center computer during the teleoperated driving session based on the QoS prediction. The method includes selecting the control category for the teleoperated driving session based on at least the available end-to-end latency presented in the QoS prediction and starting the teleoperated driving session with the selected control category and selected data class to be exchanged with the control center computer.

17 Claims, 5 Drawing Sheets

(51) Int. Cl.
  *B60W 50/00* (2006.01)
  *H04W 28/02* (2009.01)
  *H04W 4/12* (2009.01)
  *B60W 60/00* (2020.01)
  *G05D 1/02* (2020.01)
  *H04L 43/0811* (2022.01)
  *H04L 67/61* (2022.01)

(56) References Cited

U.S. PATENT DOCUMENTS

| | | | |
|---|---|---|---|
| 10,322,717 B2 | 6/2019 | Rust | |
| 10,410,250 B2* | 9/2019 | Singhal | G01C 21/3682 |
| 10,437,247 B2 | 10/2019 | Patel et al. | |
| 2007/0061053 A1 | 3/2007 | Zeitzew | |
| 2007/0064604 A1 | 3/2007 | Chen et al. | |
| 2018/0261095 A1* | 9/2018 | Qiu | G08G 1/166 |
| 2019/0163176 A1 | 5/2019 | Wang et al. | |
| 2019/0245647 A1* | 8/2019 | Alieiev | H04L 1/0017 |
| 2019/0279447 A1* | 9/2019 | Ricci | G08G 1/096775 |
| 2020/0133266 A1* | 4/2020 | Raichelgauz | G08G 1/22 |
| 2021/0116907 A1* | 4/2021 | Altman | H04W 4/44 |

FOREIGN PATENT DOCUMENTS

| | | | | |
|---|---|---|---|---|
| WO | WO-2019081039 A1 * | 5/2019 | | H04L 41/5009 |
| WO | 2019180700 A1 | 9/2019 | | |

OTHER PUBLICATIONS

Office Action for Korean Patent Application No. 10-2021-0022081; dated May 9, 2022.

\* cited by examiner

| DR in Mbit/s | E2EL in ms | ToD Data Type | ToD Type |
|---|---|---|---|
| [ 0.5, 1 ] | [ 0, 250 ] | LOR Image | Direct |
| | [ 250, 500 ] | LOR Image | Indirect |
| | [ 500, 1000 ] | LOR Image | Indirect |
| [ 1, 6 ] | [ 0, 250 ] | HIR Image | Direct |
| | [ 250, 500 ] | HIR Image | Direct |
| | [ 500, 1000 ] | HIR Image | Indirect |
| [ 6, 12 ] | [ 0, 250 ] | SD Video | Direct |
| | [ 250, 500 ] | SD Video | Direct |
| | [ 500, 1000 ] | SD Video | Indirect |
| [ 12, 30 ] | [ 0, 250 ] | HD Video | Direct |
| | [ 250, 500 ] | HD Video | Direct |
| | [ 500, 1000 ] | HD Video | Indirect |
| [ 30, 50 ] | [ 0, 250 ] | Full HD Video | Direct |
| | [ 250, 500 ] | Full HD Video | Direct |
| | [ 500, 1000 ] | Full HD Video | Indirect |

Fig. 5

| TODREQH | TODSDT | TODSCT | ECC |
|---|---|---|---|

Fig. 6

METHOD FOR INVOKING A TELEOPERATED DRIVING SESSION, APPARATUS FOR PERFORMING THE STEPS OF THE METHOD, VEHICLE AND COMPUTER PROGRAM

PRIORITY CLAIM

This patent application claims priority to European Patent Application No. 20158259.0, filed 19 Feb. 2020, the disclosure of which is incorporated herein by reference in its entirety.

SUMMARY

Illustrative embodiments relate to a method for invoking a teleoperated driving session. Illustrative embodiments also relate to a corresponding apparatus for performing the method, a corresponding transportation vehicle and a corresponding computer program.

BRIEF DESCRIPTION OF THE DRAWINGS

Exemplary embodiments are shown in the drawings and are explained in greater detail in the following description. In the drawings:

FIG. 5 shows an example of a table with different ranges of a QoS prediction used in an algorithm for selecting the type of data to be exchanged with the control center computer during the ToD session, and for selecting the control type for the ToD session based on at least the available end-to-end latency presented in the QoS prediction; and FIG. 6 shows the format of a ToD session request message.

DETAILED DESCRIPTION

Figure 1:
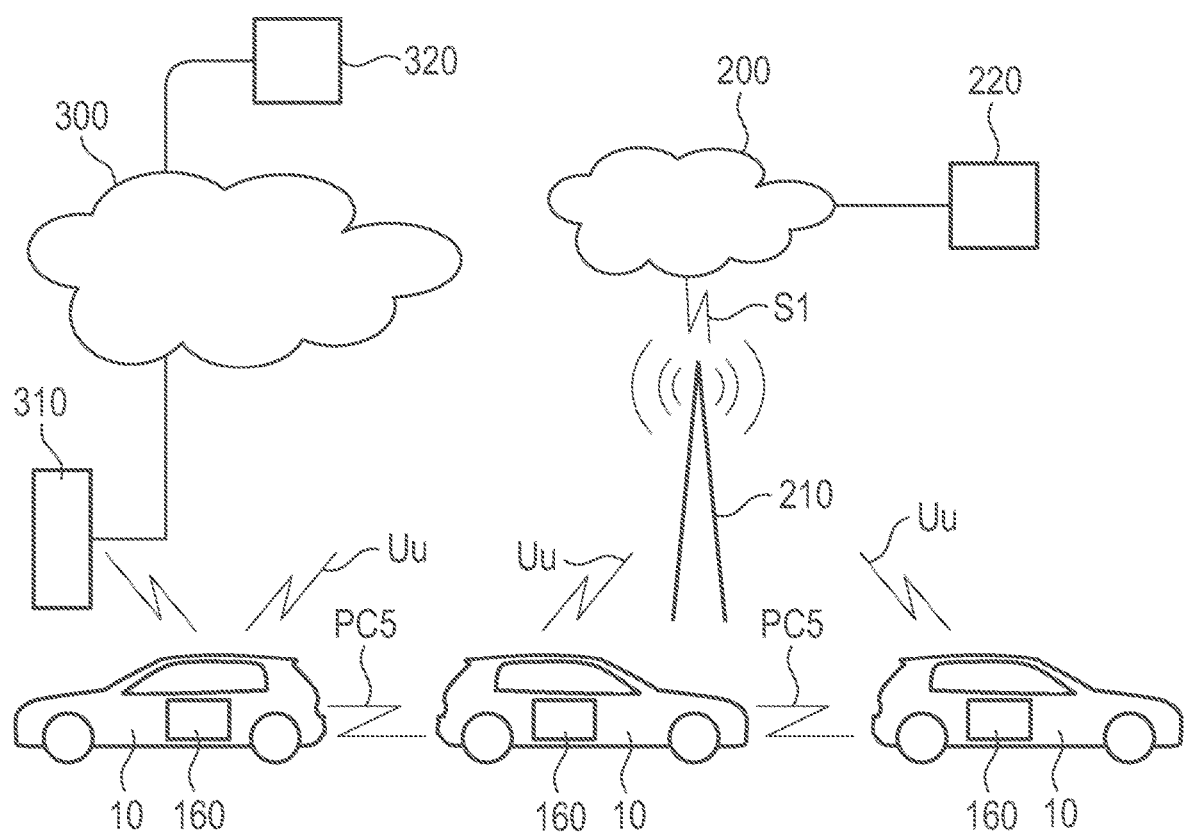
FIG. 1 illustrates the principle architecture of a V2V and V2X communication system.

Teleoperated driving (ToD) is gathering more and more interest. "Tele-operated Driving" means in this context that an external operator controls the transportation vehicle remotely. The external operator is located in a Control Center (CC). There may be a large distance between the Control Center and the transportation vehicle. Control Center and transportation vehicle are connected via a radio communication system and their backhaul. Primarily the radio communication system is part of a public mobile communication system such as LTE or 5G.

Tele-operated driving belongs to safety-related time-critical applications and the requirements for the exchange of information are low latency, high data rate and high reliability.

Autonomous driving (sometimes referred to as automatic driving, automated driving or piloted driving) is the movement of transportation vehicles, mobile robots and driverless transport systems which are largely autonomous. There are different degrees of autonomous driving. In Europe various transport ministries, for example, in Germany the Federal Institute for Road Systems (Bundesanstalt für Straßenwesen) was involved, worked together and defined the following autonomous stages.

Level 0: "Driver only", the driver drives himself, steers, gives gas, brakes, etc.

Level 1: Certain assistance systems help with transportation vehicle operation (including a cruise control system—Automatic Cruise Control ACC).

Level 2: Partial automation. Therein, automatic parking, tracking function, general longitudinal guidance, acceleration, deceleration, etc. are taken over by the assistance systems (including collision avoidance).

Level 3: High automation. The driver does not have to monitor the system continuously. The transportation vehicle independently performs functions such as the triggering of the turn signal, lane change and tracking. The driver can turn to other things, but if requested, the system is requested to take over the lead within a pre-warning period. This form of autonomy is technically feasible on motorways. Legislators are working to allow Level 3 transportation vehicles. The legal framework has already been created.

Level 4: Full automation. The guidance of the transportation vehicle is permanently adopted by the system. If the system is no longer able to handle the tasks, the driver can be asked to take the lead.

Level 5: No driver required. Apart from setting the target and starting the system, no human intervention is required.

A slightly different definition of levels is known from the Society of Automotive Engineers SAE. It is referred to the SAE J3016 standard in this regard. This could also be used instead of the above given definition.

An automated driving transportation vehicle makes its decisions based on the perception of its environment as well as from predefined traffic regulations. It has been observed that an automated transportation vehicle could then experience situations where the transportation vehicle is no longer able to continue its planned route. Incorrect interpretation of the environment, sensor failures, poor road conditions or unidentified events could prevent that the transportation vehicle could continue with its automated driving session. To distinguish all possible iterations to truly identify the root cause of the deadlock situation is not possible.

Tele-operated driving (ToD) might become a key technology to solve issues with L4/L5 driven transportation vehicles, such as interpretation issues or deadlocks. These issues occur when automatic driven transportation vehicles (AV) are not able to interpret and to solve a situation due to not clear traffic conditions, e.g., an accident or a construction site. These transportation vehicles need external instruction from someone else to solve the situation, which will be the so-called control center (CC). A ToD vehicle will be driven remotely by CC.

It is known that the ToD performance is related to the communication link performance. This link comprises the air interface (Uu link) between the transportation vehicle and the base station and then the connection through the operator backbone (core network). Depending on the quality of the link, the control of the transportation vehicle will be adapted: the transportation vehicle will be controlled directly (joystick-like) or indirectly (waypoints, or environmental model editions). The decision between the two is in the scope of this disclosure.

Hence, depending on the communication system's predicted quality of service key performance indicators (KPIs), a question is how is it possible to adapt the ToD sessions accordingly?

It is therefore one approach to use qualitative descriptions of the QoS and decide which data to transmit and deduct the control type for the ToD session.

In U.S. Pat. No. 10,437,247 B2 systems and methods for operating a transportation vehicle by switching between an autonomous control system within the transportation vehicle and a remote operator are described. For the handover between the autonomous control system and the remote operator, the system can process current maneuvering parameters of the transportation vehicle to at least select a teleoperation control type. The system can also generate a concurrent feature profile including a set of automated features that are configured to be implemented during teleoperation of the transportation vehicle. The system can implement the handover of transportation vehicle control according to the teleoperation control type while the transportation vehicle autonomously or semi-autonomously operates according to the concurrent feature profile.

In US 2019/0163176 A1 a method for transferring control of an autonomous transportation vehicle to a remote operator is presented.

In US 2019/0245647 A1 a method for data communication between communication participants is described including observing the surroundings of the transmitting participant, determining the position and motion of the communication participants, and estimating the transmission conditions at a later point in time. The solution is based on classifying the data for data communication in different categories, the categories determining susceptibility of the data to transmission errors determining which data is transmitted under good transmission conditions only and which data is be transmitted under rough transmission conditions whereby the transmission station plans the transmission of data in different categories. The method further includes selecting for data transmission at a given time for which the transmission conditions have been estimated so the data to be transmitted is in a category fitting to the estimated transmission conditions based on the categories data, and transmitting the selected data.

WO 2019/081039 A1 describes a closed-loop control of a communication system for tele-operated driving. The proposal relates to a network operator (OMS), a teleoperation application (TOApplication) and an application (TODriver) for a teleoperable transportation vehicle. The OMS is capable of creating a network slice for teleoperating a teleoperable transportation vehicle along at least one route, receiving, from the TOApplication, a slice configuration request comprising the QoS for the at least one route, and configuring the network slice to support the QoS for the at least one route. The TOApplication is capable of communicating, towards the OMS, a request for creating the network slice, receiving, from the teleoperable transportation vehicle, a teleoperation service request comprising a set of teleoperation configurations, mapping each teleoperation configuration to a respective QoS, and sending the slice configuration request comprising the QoS to the OMS. The TODriver is capable of sending the teleoperation service request to the TOApplication, and controlling the route to be followed by the teleoperable transportation vehicle based on information from the TOApplication.

In U.S. Pat. No. 9,494,935 B2 computer devices, systems, and methods for remotely operating an autonomous passenger transportation vehicle are disclosed. When an autonomous transportation vehicle encounters an unexpected driving environment unsuitable for autonomous operation, such as road construction or an obstruction, transportation vehicle sensors can capture data about the transportation vehicle and the unexpected driving environment, including images, radar and lidar data, etc. The captured data can be sent to a remote operator. The remote operator can manually operate the transportation vehicle remotely or issue commands to the autonomous transportation vehicle to be executed by on various vehicle systems. The captured data sent to the remote operator can be optimized to conserve bandwidth, such as by sending a limited subset of the captured data.

Until now, the decision is based on a solution describing the quality of the link, relating it to transmitted data and then making a decision regarding the type of control.

There are multiple limitations to this solution. First, the description of the QoS is very qualitative. Second, this solution assumes that the control type is dependent on the input (e.g., low resolution images imply indirect control). This assumption is limiting as the transmitted data choice is dependent on the uplink data rate whilst the control type should be chosen using the end to end latency. Indeed, it can be possible to directly command the car with high resolution, high frequency images if the latency is good enough.

It is not precise in the QoS description and forbids many cases where the car could be directly controlled but different types of data could be transmitted as control is limited by latency and data transmission mostly by data rate.

It is therefore needed to answer the question: How to select more accurately what type of ToD session control is more appropriate for the determined QoS prediction and what type of data is better suited for the determined QoS prediction to improve the performance of the ToD session if needed?

Disclosed embodiments provide a method, a corresponding apparatus for performing the method, a transportation vehicle and a corresponding computer program.

To solve the problem, a disclosed embodiment consists in a method for invoking a teleoperated driving session, for a transportation vehicle equipped with an automated driving function, hereinafter called ToD session, the transportation vehicle being equipped with a number of environment detection sensors and a communication module for communicating to a control center computer. The method comprises determining a quality of service prediction for the communication between the transportation vehicle and the control center computer for the time when the ToD session should be invoked, and selecting the type of data to be exchanged with the control center computer during the ToD session based on the QoS prediction. The method further comprises selecting the control type for the ToD session based on at least the available end-to-end latency presented in the QoS prediction and starting the ToD session with the selected control type and selected data type to be exchanged with the control center computer.

There are basically two types of ToD session driving controls existing, direct control where the operator in the control center is using a remote steering wheel and a throttle and braking paddle. Here, he drives the transportation vehicle based on the visual feedback he receives in a streaming session from the environment detection sensors which is established between transportation vehicle and control center computer. The other form of control is an indirect control where the control center computer does not send live control commands with which steering, braking and throttle are directly controlled under real time conditions. Instead, waypoints are submitted to the transportation vehicle lying on a trajectory along which the transportation vehicle shall drive to get out of the blocking situation. The autonomous driving function gets the waypoints and drives intermittently to the succeeding locations. This, however, takes much longer than with direct control. Since for the decision which control type is to be used, the end-to-end latency is to be taken into consideration the overall performance of the ToD session is better.

The performance of the remote control during a ToD session can be further increased, when the operation of selecting the type of data to be exchanged with the control center computer during the ToD session comprises selecting the type of data to be exchanged with the control center computer based on the available data rate presented in the QoS prediction.

Of course, the quality of service prediction is also important for the performance of the ToD session. Primarily the QoS prediction is performed in the transportation vehicle itself based on the observations of the built-in environment detection sensors. It is beneficial if the operation of determining a quality of service prediction for the communication between the transportation vehicle and the control center computer for the time when the ToD session should be invoked comprises receiving a QoS prediction from a communication service prediction server or the control center computer. The network operator may have a good QoS prediction for the transportation vehicle position based on historical environment observations and statistical analysis.

In at least one disclosed embodiment it is beneficial to start the ToD session, with initiating the sending of a ToD session request message to the control center computer (320), wherein the ToD session request message contains the information about the selected control type and the selected data type to be exchanged with the control center computer.

In a further exemplary embodiment of the disclosed method further comprises evaluating the receiving signal strength RSS of the QoS prediction, and when it is found that the predicted RSS value is below a limit value, the ToD session is terminated. This way the preparation of the ToD session will be stopped when it is found that the receiving signal strength is poor. The idea helps to avoid superfluous ToD session preparations.

Another exemplary embodiment concerns an apparatus adapted for performing the operations in the disclosed method. The apparatus comprises a number of environment detection sensors and a communication module for communicating to a control center computer, and a processing device. It is beneficial, that the processing device comprises methods or mechanisms for determining a quality of service prediction for the communication between the transportation vehicle and the control center computer for the time when the teleoperated driving session should be invoked, methods or mechanisms for selecting the type of data to be exchanged with the control center computer during the ToD session based on the QoS prediction, methods or mechanisms for selecting the control type for the ToD session based on at least the available end-to-end latency presented in the QoS prediction and methods or mechanisms for starting the ToD session based on the selected control type and selected data type to be exchanged with the control center computer.

The starting of the ToD session can be performed with methods or mechanisms for initiating the sending of a ToD session request message to a control center computer. Here, it is further beneficial, that the ToD session request message contains the selected type of data to be exchanged with the control center computer and the selected control type. This way, the most appropriate ToD session will be invoked and the overall performance of the ToD session will be increased.

In an exemplary embodiment, the method or mechanism for determining a quality of service prediction for the communication between the transportation vehicle and the control center computer for the time when the ToD session should be invoked comprises methods or mechanisms for receiving a QoS prediction from a communication service prediction server or the control center computer. This way the accuracy of the QoS predictions may be increased, since at the backend the results of a great plurality of QoS predictions from the past may be archived and can be evaluated with statistical analysis.

Optionally, the method or mechanism for receiving a QoS prediction from a communication service prediction server or the control center computer comprise the communication module.

A still further exemplary embodiment also concerns a transportation vehicle which is equipped with an exemplary apparatus.

The proposal also concerns a computer program, comprising program code, which, when run in a processing device of the disclosed apparatus, cause it to carry out the disclosed method.

In summary, with the present disclosure it is possible to consider the quality of service as multiple values and to consider the impact of all these indicators for the ToD decision (data transmission and type of control).

The above presented solution is provided for a full ToD session. The same concept could, however, also be applied for sections of the full ToD session. This then means that the future QoS is divided in smaller time intervals, and the transmitted data type and type of control may be changed for each interval. It is, however, noted, that if the receiving signal strength value RSS is too low at some point, the full ToD session will be aborted.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed furthering the art, and are to be construed as being without limitation to such specifically recited examples and conditions.

Moreover, all statements herein reciting principles and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided by the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a method or mechanism for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited methods or mechanisms are combined and brought together in the way in which the claims call for. It is thus regarded that any methods or mechanisms that can provide those functionalities are equivalent to those shown herein.

FIG. 1 shows the system architecture for the proposal. Reference number 10 denotes a transportation vehicle. The depicted transportation vehicle 10 is exemplified as a car. Shown is a passenger car. In other examples it may be any type of a transportation vehicle. Examples of other types of vehicles are: buses, motorcycles, commercial vehicles, in particular, trucks, agricultural machinery, construction machinery, rail vehicles, etc. The use of the disclosed embodiments would generally be possible in land vehicles, rail vehicles, watercrafts and aircrafts. This expressively includes robots and drones. The transportation vehicle 10 is equipped with an on-board communication module 160 including corresponding antenna such that the transportation vehicle 10 can participate in any form of a mobile communication service. FIG. 1 illustrates that transportation vehicle 10 may transmit and receive signals to and from a base station 210 of a mobile communication service provider.

Such base station 210 may be an eNodeB base station of an LTE (Long Term Evolution) mobile communication service provider or a gNB base station of a 5G mobile communication provider. The base station 210 and the corresponding equipment is part of a mobile communication network with a plurality of network cells where each cell is served by one base station 210.

The base station 210 in FIG. 1 is positioned close to a main road on which the transportation vehicle 10 is driving. Of course, other transportation vehicles may also drive on the road. In the terminology of LTE, a mobile terminal corresponds to a user equipment UE, which allows a user to access network services, connecting to the UTRAN or Evolved-UTRAN via the radio interface. Typically, such user equipment corresponds to a smart phone. Of course, mobile terminals are also used in the transportation vehicles 10. The cars 10 are equipped with the on-board communication module OBU 160. This OBU corresponds to an LTE, 5G or any other communication module with which the transportation vehicle 10 can receive mobile data in downstream direction and can send such data in upstream or in direct device-to-device direction.

In terms of the LTE mobile communication system, the Evolved UMTS Terrestrial Radio Access Network E-UTRAN of LTE consists of a plurality of eNodeBs, providing the E-UTRA user plane (PDCP/RLC/MAC/PHY) and control plane (RRC) protocol terminations towards the UE. The eNodeBs are interconnected with each other by the so-called X2 interface. The eNodeBs are also connected by the so-called S1 interface to the EPC (Evolved Packet Core) 200, more specifically to the MME (Mobility Management Entity) by the S1-MME and to the Serving Gateway (S-GW) by the S1-U interface.

From this general architecture FIG. 1 shows that eNodeB 210 is connected to the EPC 200 via the S1 interface and that EPC 200 is connected to the Internet 300. The control center computer 320 to which the transportation vehicles 10 send messages to and receive messages from is also connected to the Internet 300. In the field of cooperative and automated driving the control center computer 320 typically is located in a traffic control center where the operators for the ToD sessions requested by the transportation vehicles 10 are working. Finally, an infrastructure network component is also shown. This may be exemplified by a road-side unit RSU 310. For the ease of implementation, it is considered that all components have assigned an Internet address, typically as an IPv6 address, such that the packets transporting messages between the components can be routed correspondingly.

The various interfaces of the LTE network architecture are standardized. It is particularly referred to the various LTE specifications, which are publicly available for the sake of sufficiently disclosing further implementation details.

The transportation vehicles 10 may also be equipped with methods or mechanisms for surroundings observation. The sensor system, which is used to capture the environmental objects is based on different measuring methods depending on the application. Widespread technologies are among others RADAR corresponding to Radio Detection and Ranging, LIDAR corresponding to Light detection and ranging, cameras 2D and 3D and ultrasonic sensors.

Figure 2:
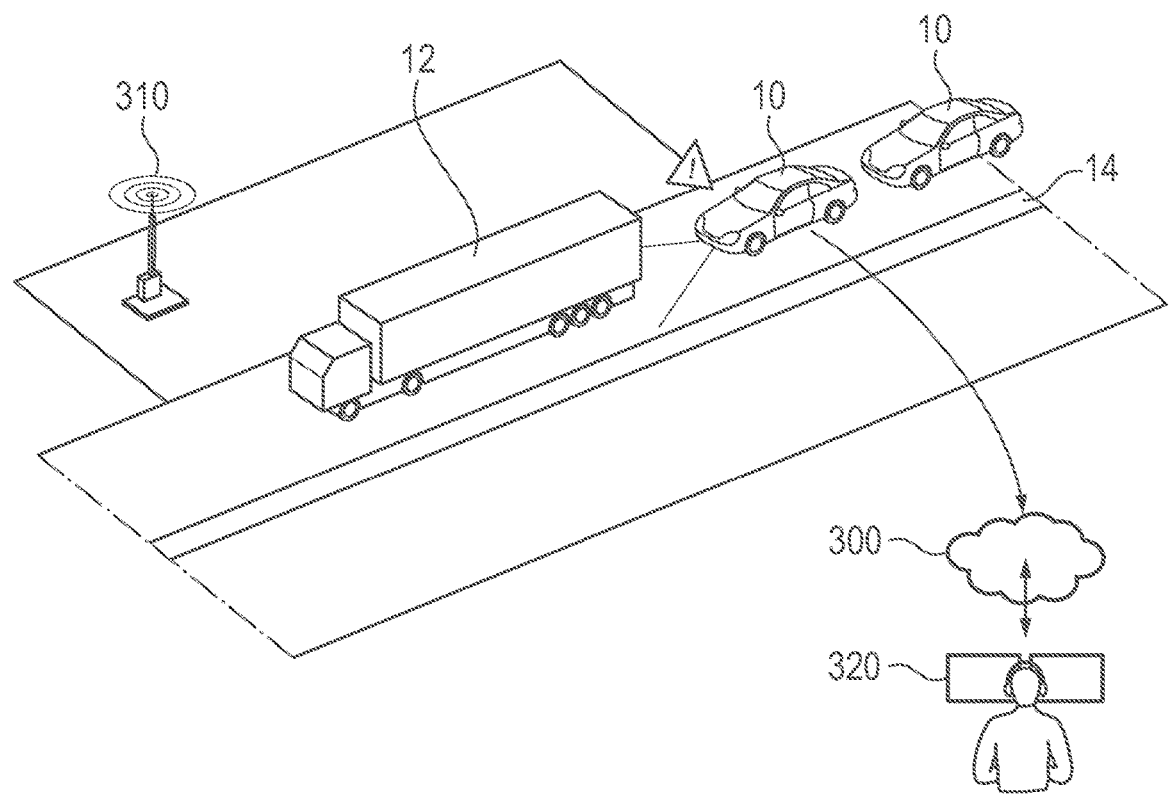
FIG. 2 shows a first application scenario of teleoperated driving.

FIG. 2 depicts an example of a deadlock situation in which ToD could help to resolve the situation. A truck 12 is blocking a one-way road. Succeeding transportation vehicles 10 are automated transportation vehicles with level 4 or 5 automated driving capability in the need to pass this obstacle. The automated driving functionality needs to respect all the traffic regulations including traffic signs and traffic lights, etc. Since it is not an option for the automated driving function to drive over the sidewalk 14 to pass the truck, the transportation vehicle 10 remains behind the truck 12 and waits until the truck 12 moves on. This, however, could take hours if e.g., the truck 12 is stopping inadvertently, e.g., due to a breakdown or a road accident. To overcome this deadlock situation, the transportation vehicles 10 would need to drive over the sidewalk to continue their planned route.

Here, the automated transportation vehicle 10 might not be able to identify that the truck 12 will be there for 1 minute, 1 hour or an indefinitely period of time blocking its path.

ToD would help to drive the transportation vehicle 10 carefully with two wheels over the sidewalk 14 to resolve the blocking situation. To initiate a ToD session the transportation vehicle 10 needs to decide if this situation is indeed a deadlock situation with no way out for the automated driving function of the car 10.

There are basically two possibilities to start a ToD session. Those which are considered to be triggered via a manual request from the inside of the transportation vehicle (Human Interface such as: the press of a button, dictation of a voice command or any other type of human interaction method) and those to be triggered automatically and are based on different conditions which are known by the automated transportation vehicle.

Figure 3:
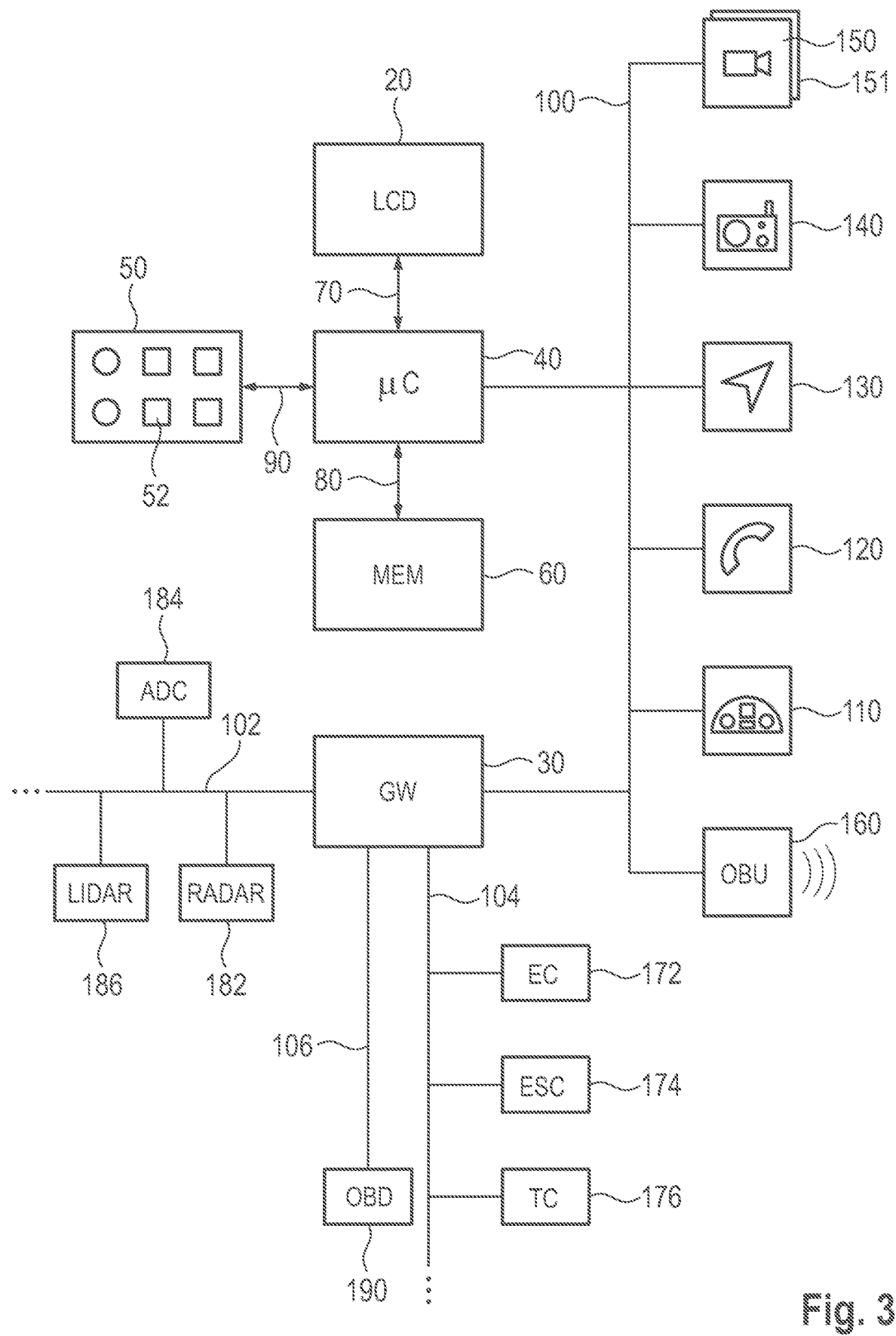
FIG. 3 shows a block diagram of a transportation vehicle's electronics system.

FIG. 3 shows schematically a block diagram of the transportation vehicle's 10 board electronics system. Part of the board electronics system is an infotainment system which comprises: the touch-sensitive display unit 20, a computing device 40, an input unit 50, and a memory 60. The display unit 20 includes both a display area for displaying variable graphical information and an operator interface (touch-sensitive layer) arranged above the display area) for inputting commands by a user. With reference number 52 a press button is labelled that allows the driver to manually request a ToD session if the transportation vehicle 10 is blocked and the driver wants the support of ToD to find a way out of the blocking situation. There is no need for a dedicated press button 52 if other techniques for manual control are used. This includes selecting an option in a user menu displayed on the display unit 20, detecting the command with speech recognition, or using gesture control methods or mechanisms.

The memory device 60 is connected to the computing device 40 via a further data line 80. In the memory 60, a pictogram directory and/or symbol directory is deposited with the pictograms and/or symbols for possible overlays of additional information.

The other parts of the infotainment system such as camera 150, radio 140, navigation device 130, telephone 120 and instrument cluster 110 are connected via the data bus 100 with the computing device 40. As data bus 100 the high-speed option of the CAN bus according to ISO standard 11898-2 may be taken into consideration. Alternatively, for example, the use of an Ethernet-based bus system such as IEEE 802.03cg is another example. Bus systems in which the data transmission via optical fibers happens are also usable. Examples are the MOST Bus (Media Oriented System Transport) or the D2B Bus (Domestic Digital Bus). For inbound and outbound wireless communication, the transportation vehicle 10 is equipped with a communication module 160. It can be used for mobile communication, e.g., mobile communication according to the 5G standard.

Reference numeral 172 denotes an engine control unit. The reference numeral 174 corresponds to an ESC control unit corresponding to electronic stability control and the reference numeral 176 denotes a transmission control unit. The networking of such control units, all of which are allocated to the category of the drive train, typically occurs with the CAN bus system (controller area network) 104. Since various sensors are installed in the transportation vehicle and these are no longer only connected to individual control units, such sensor data are also distributed via the bus system 104 to the individual control devices.

However, the modern transportation vehicle 10 can also have further components such as further surroundings scanning sensors like a LIDAR (Light Detection and Ranging) sensor 186 or RADAR (Radio Detection and Ranging) sensor 182 and more video cameras 151, e.g., as a front camera, rear camera or side camera. Such sensors are used more and more in transportation vehicles for surroundings observation. Further control devices, such as an automatic driving control unit ADC 184, etc., may be provided in the transportation vehicle. The RADAR and LIDAR sensors 182, 186 could be used for scanning a range up to 150 m or 250 m and the cameras 150, 151 cover a range from 30 to 120 m. The components 182 to 186 are connected to another communication bus 102. The Ethernet-Bus may be a choice for this communication bus 102 due to its higher bandwidth for data transport. One Ethernet-Bus adapted to the special needs of car communication is standardized in the IEEE 802.1Q specification. Moreover, a lot of information for surroundings observation may be received via V2V communication from other road participants. Particularly for those road participants not being in line of sight LOS to the observing transportation vehicle it is very beneficial to receive the information about their position and motion via V2V communication.

Reference number 190 denotes an on-board diagnosis interface.

For the purpose of transmitting the transportation vehicle-relevant sensor data via the communication interface 160 to another transportation vehicle 10 or to the control center computer 320, the gateway 30 is provided. This is connected to the different bus systems 100, 102, 104 and 106. The gateway 30 is adapted to convert the data it receives via the one bus the transmission format of the other bus so that it can be distributed in the packets specified there. For the forwarding of this data to the outside, i.e., to another transportation vehicle 10 or to control central computer 320, the on-board communication unit 160 is equipped with the communication interface to receive these data packets and, in turn, to convert them into the transmission format of the correspondingly used mobile radio standard. The gateway 30 takes all the necessary format conversions if data are to be exchanged between the different bus systems if required.

Since automated driving is on the rise, a lot more data needs to be exchanged among the road participants and also between the road participants and the network. The communication systems for V2V and V2X communication need to be adapted correspondingly. The 3GPP standard setting organization has been and is releasing features for the new generation of the 5G cellular mobile communication system, including transportation vehicle-to-everything (V2X) features. A large panel of vehicular use cases have been designed, ranging from infotainment to cooperative driving. Depending on the application, the requirement on the Uu link in the scope of vehicle-to-network (V2N) communication drastically changes. When it comes to safety-related time-critical applications such as ToD, in which a command center (CC) takes over some driving functions of the transportation vehicle 10, these requirements are the exchange of information with low latency, high data rate and high reliability.

The automatic driving control unit 184 comprises the algorithms to control the transportation vehicle for automatic driving. Whenever these algorithms detect that the transportation vehicle 10 is stuck in a traffic situation for which the ADC unit 184 does not have the appropriate rights to drive on, the ADC unit 184 should send a ToD session request via gateway 30 and communication module 160 to the control center computer 320 to get help from there.

At the CC there is a computer working place equipped with a number of monitors where a person is responsible for traffic control in a certain region. His job consists basically of the task of governance, surveillance and controlling. It is noted that on some neuralgic places there are surveillance cameras (not shown) installed, the video streams of which will be transferred to the CC, too, where they will be displayed on a monitor. He will take over control of the automatic transportation vehicle 10. By remote control, the transportation vehicle 10 will be controlled to pass the truck 12. transportation Vehicle 10 will be steered to drive partly over the sidewalk to pass the truck 12. After the transportation vehicle 10 has been steered around the truck 12, the tele-operator hands back full control to the automatic driving function in transportation vehicle 10.

The algorithm running in ADC unit 184 to find out whether or not there is a driving situation existing in which the automatic driving function of the transportation vehicle 10 has no right to carry on with the control of the transportation vehicle 10, is not in focus of the disclosure. This algorithm is working with the data taken or derived from the transportation vehicle's own sensors, such as Radar 182, Lidar 186, cameras 150, 151, etc. Resulting from these environment detection sensors is a very accurate environment map, in which surrounding objects are represented. These surrounding objects may concern other road participants like other transportation vehicles, bicycles, persons walking on the sidewalk; traffic signs and traffic lights; obstacles in the way, width of a road, width of the sidewalk, and so on. Once the algorithm has recognized that transportation vehicle 10 is stuck in a deadlock situation, it will start a program for initiating a ToD session with the control center computer 320.

Figure 4:
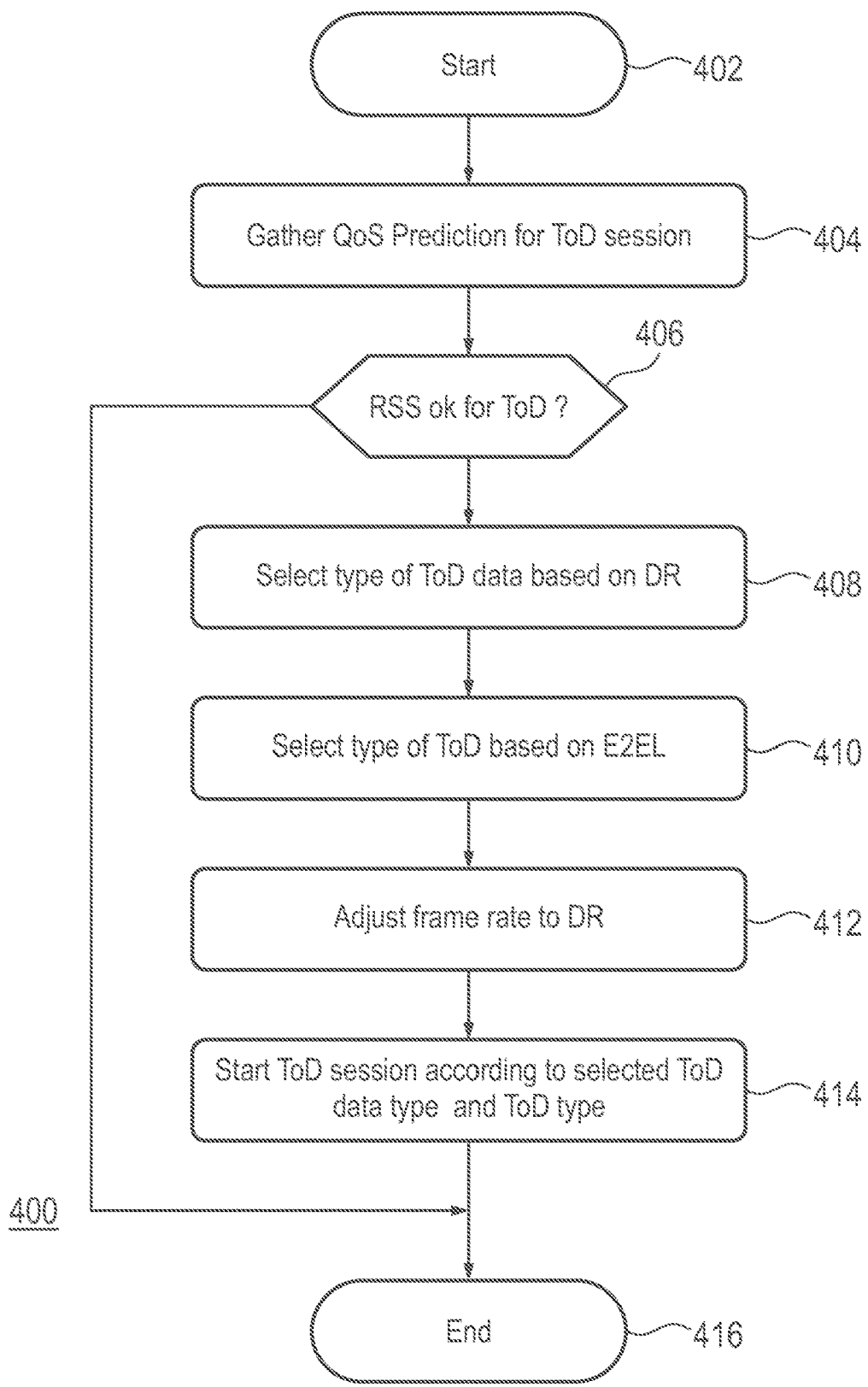
FIG. 4 shows a flow chart for a computer program for implementing the proposal.

FIG. 4 shows a flow chart of the program for initiating a ToD session. The control center computer 320, each time the transportation vehicle 10 requests a ToD session, either positively acknowledges the entering in the ToD mode or denies it when having evaluated the current situation where the transportation vehicle 10 is stuck in. To evaluate the situation in the control center a streaming session will be established between transportation vehicle 10 and control center computer 320. In this streaming session, the video streams from the cameras 150, 151 and the Radar 182 and Lidar 186 sensors are transferred to the control center computer 320. An Internet streaming protocol such as RTSP corresponding to Real Time Streaming Protocol may be used for that purpose. Those streams will be decoded and presented to the operator in the control center on his number of monitors. Therefore, either the operator or a machine in the control center decides if the situation is requiring ToD or not and either triggers the sending of an acknowledgement for ToD or denies the entering of the ToD session.

Before starting the streaming session, the message for requesting a ToD session will be transmitted from transportation vehicle 10 to control center computer 320. The message will be sent to the control center computer 320 via wireless communication, e.g., cellular mobile communication (LTE, 5G, etc.) or ad hoc communication, e.g., based on WLAN p. The control center computer 320 will then start a streaming session between transportation vehicle 10 and the control center computer 320 as mentioned above. The sensor data of the environment detection sensors will be streamed from transportation vehicle 10 to the control center computer 320. The transmission conditions for the streaming session are however not equal at all locations and depend on various factors. Some of them are traffic density, objects like buildings, other road participants, traffic signs, trees, etc. in the surrounding. Also, it is dependent on geographical conditions and weather conditions. It may also depend on the time, such as time of day, day of week, month of year, etc. Since the transmission conditions are dynamically changing all the time, there is a need to estimate the transmission conditions before starting the ToD session. Obviously, it is not possible to start video streaming with full HD resolution for the case where the transmission conditions are not good enough. One solution for this issue is a so-called sensor-based predicted communication technique. Normal link adaptation takes time, and these techniques applied to current transmission conditions are not always very efficient in highly varying V2X channels. The conditions may be obsolete before link adaptation has been performed. The senor-based predicted communication technique comprises observing the surroundings of the transmitting participant, determining the positon and motion of the communication participants, and estimating the transmission conditions for a later point in time. This solution is disclosed in the patent application publication document EP 3 535 374 A1 and DE 10 2015 214 968 A1 and in the application EP 18198192.9 of the applicant. Therefore, a solution for the prediction of the quality of service is already available, and it is expressively referred to the cited references.

After the start of the program in operation at 402, it follows in operation at 404 the determination of the QoS prediction for the ToD session. In this operation, therefore, the results from the sensor-based QoS prediction as disclosed in above mentioned reference are collected. The location information corresponds to the location where the transportation vehicle 10 has stopped moving forward and transmitted the request message for a ToD session. The time information corresponds to the time when the ToD session shall be started up to the estimated time for the duration of the ToD maneuver.

The derived QoS prediction includes values for the QoS parameters at least for the uplink direction on the Uu link for LTE or 5G mobile communication or for the WLAN p uplink direction. Examples of QoS parameters listed in the QoS prediction are data rate DR, end-to-end latency E2EL, error rate in form of packet error rate PER or bit error rate BER, and receiving signal strength RSS.

In operation at 406 it follows a query in which it is checked if the estimated receiving signal strength RSS is sufficient for the planned ToD session. There exists a relatively sharp limit for the receiving signal strength RSS up to where it is possible to demodulate the received signals. If the received signals are below that limit the error rate is drastically rising and it is not possible any longer to correct the errors based on the supplied error correction code in the data frame. If the estimated RSS value is below the limit, the ToD session will be aborted right from the beginning. This is depicted in the drawing with a branch arrow that points to the end of the program in operation at 414.

If the estimated RSS value is good enough, the program proceeds further with operation at 408. In operation at 408 the type of data to be exchanged during the ToD session is selected based on the available data rate for the uplink communication. This is done with a table in which the different categories of data are listed for the different data rate ranges. An example of the table is listed in FIG. 5. The data rate DR is presented in units of Mbit/s in the ranges [0.5; 1]; [1; 6]; [6; 12]; [12; 30]; and [30; 50] Mbit/s. For the example of video images captured by video camera 150, 151, and encoded in an HEVC encoder, corresponding to the high efficiency video coding standard H.265, it is feasible to stream SD video quality images starting at a data rate of 6 Mbit/s. HD video quality images may be streamed with a data rate in the range of 12 to 30 Mbit/s. Full HD video quality images may be streamed with a data rate in the range of 30 to 50 Mbit/s. Below 6 Mbit/s it is possible to stream high resolution still pictures with an adequate frame rate of 15 Hz. Below 1 Mbit/s it is only possible to stream SD video quality resolution images at a frame rate of 15 Hz. The operation at 408, therefore, determines what sort of video or image quality (low resolution image, high resolution image, low resolution video, high resolution video) is selected for the ToD session to be invoked. Also the frame rate is roughly determined in this operation. In operation at 410, the type of the ToD session to be invoked is determined. There are two types existing, direct control and indirect control. Here, with direct control the transportation vehicle 10 will be controlled directly under real-time constraints (joystick-like) or better using a remote steering wheel at the control center. Indirect control methods or mechanisms the transportation vehicle 10 will be controlled in other form without real time constraints, by transmitting waypoints to the transportation vehicle successively which the transportation vehicle 10 needs to reach slowly but with its own control commands and environmental model editions. Very important for this decision is the end-to-end latency. If the end-to-end latency E2EL is in the range of 0 to 250 ms, the experienced operators are able to control the transportation vehicles directly. This also works with low resolution images with a frame rate of 15 Hz. Above 250 ms latency, with low resolution images no direct control is used for safety reason. With high resolution images at 15 Hz frame rate the direct control is possible in low speed. For SD video quality streaming, at 25 Hz or more, the direct control is selected in the ranges of [6; 12], [12; 30] and [30; 50] Mbit/s data rate when the end-to-end latency E2EL is below 500 ms. If the latency is higher than 500 ms, the direct control is not possible any longer even with video streaming with full HD video quality and more than 25 Hz frame rate since it takes too long until the feedback from the environment detection sensors arrives at the control center. Once the decision for direct control or indirect control has been made, it follows an operation of adjusting the frame rate to the estimated data rate in operation at 412. If the estimated data rate is equal to 5 Mbit/s the still picture streaming can be increased to 20 Hz for HD quality images. Correspondingly, the frame rate could be increased for video streaming. The aim is to adjust the frame rate as much as possible to the estimated data rate DR to allow a direct control during the ToD session. In operation at 414, the ToD session will be started by sending the ToD session request message to the control center computer 320.

To control the transportation vehicle 10, interface commands are needed to be transmitted from the control center computer 320 to the transportation vehicle 10. These commands have to be specified to meet the system requirements. Essential commands to control the transportation vehicle 10 in the teleoperation mode are desired steering angle, throttle position and brake pressure. For full maneuverability in teleoperation mode commands for shifting gears can be required to be able to reverse together with parking brake commands. This will require access to the CAN-bus 104 on the transportation vehicle 10. Status messages from the transportation vehicle 10 to the control center computer 320 are required to monitor the condition and feedback from the driving. In addition to the streaming session, a number of data messages are needed. This can include the actual steering angle, speedometer data and gear indicator. If error codes are set in the transportation vehicle 10, these need to be forwarded to the operator, too, to allow for appropriate actions. Other status messages are different kinds of status indicators for the transportation vehicle 10. This can be indicators if high beams are being used, fuel level, load weight and so on.

FIG. 6 shows the message format of the ToD session request message TODREQ. With reference sign TODREQH the message header is denoted. In the message header there is at least an entry for message type and another entry for the UE address the message is coming from. As explained before, the on-board communication module 160 has implemented a qualified UE category. Any form of appropriate address information could be used here. Examples are Media Access Control address MAC, International Mobile Station Equipment Identity number IMEI, etc. In the first field TODSDT of the payload section of the ToD session request message TODREQ there is a listing of the data type to be used during the streaming session of the ToD session. This may be any of the entries in the table of FIG. 5 in column ToD Data Type. In the field TODSCT the control type for the ToD session is listed. This can be direct control or indirect control as mentioned above. In the following ST field an entry about the start time is transported, i.e., the time or time period when the transportation vehicle 10 wants to start the route. In the last field, ECC an error check code is listed. This may be a CRC code or the like.

It is to be understood that the proposed method and apparatus may be implemented in forms of hardware, software, firmware, special purpose processors, or a combination thereof. Special purpose processors may include application specific integrated circuits (ASICs), reduced instruction set computers (RISCs) and/or field programmable gate arrays (FPGAs). Optionally, the disclosed method and apparatus is implemented as a combination of hardware and software. Moreover, the software may be implemented as an application program tangibly embodied on a program storage device. The application program may be uploaded to and executed by a machine comprising any suitable architecture. Optionally, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon how the proposed method and apparatus is programmed. Given the teachings herein, one of ordinary skill in the related art will be able to contemplate these and similar implementations or configurations of the proposed method and apparatus.

REFERENCE SIGN LIST

10 Transportation Vehicle
12 Truck
14 Sidewalk
20 Touch Screen
30 Gateway
40 Computing Device
50 Operation Element Unit 52 Press Button
60 Memory Unit
70 Data Line to Display Unit
80 Data Line to Memory Unit
90 Data Line to Operation Element Unit
100 $1^{st}$ Data Bus
102 $2^{nd}$ Data Bus
104 $3^{rd}$ Data Bus
106 $4^{th}$ Data Bus
110 Multifunction Display
120 Telephone
130 Navigation System
140 Radio
150 Front Camera
151 Back, Left, Right Camera
160 On-Board Unit
172 Engine Control Device
174 ESP Control Device
176 Transmission Control Device
182 RADAR Sensor
184 Automatic Driving Control Device
186 LIDAR Sensor
190 On-Board Diagnosis Interface
200 Evolved Packet Core
210 Base Station
220 Communication Service Prediction Server
300 Internet
310 Road Side Unit
320 Control Center Computer
400 Algorithm
402-416 different Program Operations of a Computer Program
PC5 V2V Communication Link
S1 S1-Interface
Uu V2N Communication Link

The invention claimed is:

1. An apparatus for invoking a teleoperated driving session for a transportation vehicle equipped with an automated driving function, the apparatus comprising:
a plurality of environment detection sensors;
a communication module for communicating to a control center computer; and
a processing device configured to
determine a quality of service prediction for the communication between the transportation vehicle and the control center computer for the time when a teleoperated driving session is invoked,
select a type of data to be exchanged with the control center computer during the teleoperated driving session between image data and video data based on an available data rate presented in the quality of service prediction,
select a type of driving control for the teleoperated driving session between a direct control and an indirect control based on at least the available end-to-end latency presented in the quality of service prediction,
increase a rate of image transmission in accordance with the available data rate in response to the selected type of data to be exchanged with the control center computer being the image data, and
initiate the teleoperated driving session using the selected type of data to be exchanged with the control center computer and the selected type of driving control.

2. The apparatus of claim 1, wherein the processing device, as part of the determination of the quality of service prediction, receives a quality of service prediction from the control center computer or a communication service prediction server.

3. The apparatus of claim 1, wherein the processing device receives the quality of service prediction from the control center computer or a communication service prediction server via the communication module.

4. The apparatus of claim 1, wherein the processing device, as part of the starting of the teleoperated driving session request, is configured to send a teleoperated driving session request message to the control center computer, wherein the teleoperated driving session request message includes the selected type of data to be exchanged with the control center computer and the selected type of driving control.

5. The apparatus of claim 1, wherein the processing device evaluates the receiving signal strength of the quality of service prediction, and terminates the teleoperated driving session in response to determining that the predicted receiving signal strength value is below a limit value.

6. A transportation vehicle comprising the apparatus of claim 1.

7. A non-transitory computer readable medium including a computer program that comprises computer program code, which when run on a computer processor, provides the processing device of claim 1.

8. A method for invoking a teleoperated driving session for a transportation vehicle equipped with an automated driving function, wherein the transportation vehicle is equipped with a plurality of environment detection sensors and a communication module for communicating to a control center computer, the method comprising:
determining a quality of service prediction for communication between the transportation vehicle and the control center computer during a teleoperated driving session;
selecting a type of data to be exchanged with the control center computer during the teleoperated driving session between image data and video data based on an available data rate presented in the quality of service prediction;
selecting a type of driving control for the teleoperated driving session between a direct control and an indirect control based on at least the available end-to-end latency presented in the quality of service prediction;
increasing a rate of image transmission in accordance with the available data rate in response to the selected type of data to be exchanged with the control center computer being the image data; and
initiating the teleoperated driving session using the selected type of driving control and the selected type of data to be exchanged with the control center computer.

9. The method of claim 8, wherein the determining a quality of service prediction for the communication between the transportation vehicle and the control center computer for the time when the teleoperated driving session is invoked comprises receiving a quality of service prediction from a communication service prediction server.

10. The method of claim 8, wherein the starting the teleoperated driving session comprises initiating the sending of a teleoperated driving session request message to the control center computer, wherein the teleoperated driving session request message contains the selected type of data to be exchanged with the control center computer and the selected type of driving control.

11. The method of claim 8, wherein the method further comprises evaluating the receiving signal strength of the quality of service prediction, and, terminating the teleoperated driving session in response to determining that the predicted receiving signal strength value is below a limit value.

12. The apparatus of claim 1, wherein the processing device is configured to determine the predicted quality of service by observing the surroundings of the transportation vehicle, determining a positon and motion of the transportation vehicle and a position of the control center computer, and estimating the transmission conditions for a later point in time.

13. The apparatus of claim 12, wherein the position of the transportation vehicle is a location of the transportation vehicle when the transportation vehicle stopped moving forward and transmitted the request message for the teleoperated driving session, and wherein the later point in time is a period from a start time of one of a direct teleoperated driving session and an indirect teleoperated driving session to an end time of the one of the direct teleoperated driving session and the indirect teleoperated driving session.

14. The apparatus of claim 1, wherein the processing device is configured to, prior to selecting the type of data, determine whether the receiving signal strength associated with the predicted quality of service is greater than a predefined threshold, and
one of
select the type of data in response to the receiving signal strength being greater than the predefined threshold, and
abort requesting initiation of the teleoperated driving session in response to the receiving signal strength being less than the predefined threshold.

15. The method of claim 8, wherein determining the predicted quality of service includes observing the surroundings of the transportation vehicle, determining a positon and motion of the transportation vehicle and a position of the control center computer, and estimating the transmission conditions for a later point in time.

16. The method of claim 15, wherein the position of the transportation vehicle is a location of the transportation vehicle when the transportation vehicle stopped moving forward and transmitted a request message for the teleoperated driving session, and wherein the later point in time is a period from a start time of one of a teleoperated driving session and an indirect teleoperated driving session to an end time of the one of the direct teleoperated driving session and the indirect teleoperated driving session.

17. The method of claim 8 further comprising, prior to selecting the type of data, determining whether the receiving signal strength associated with the predicted quality of service is greater than a predefined threshold, and
one of
selecting the type of data in response to the receiving signal strength being greater than the predefined threshold, and
aborting requesting initiation of the teleoperated driving session in response to the receiving signal strength being less than the predefined threshold.

* * * * *